United States Patent [19]

Murphy et al.

[11] Patent Number: 5,239,933
[45] Date of Patent: Aug. 31, 1993

[54] AUTO RACK PANEL GAP SEALER AND BUMPER

[75] Inventors: Richard F. Murphy, Batavia; Michael K. Burke, Wheaton; Michael K. Murphy, Aurora, all of Ill.

[73] Assignee: Zeftek, Inc., Batavia, Ill.

[21] Appl. No.: 847,660

[22] Filed: Mar. 5, 1992

[51] Int. Cl.⁵ .............................................. B61D 45/00
[52] U.S. Cl. ...................... 105/374; 105/404; 267/140; 411/45; 52/288
[58] Field of Search ............ 105/355, 374, 392.5, 105/404, 410/4, 66; 267/140; 411/44, 45, 49, 57, 508; 293/128; 52/288, 716.1, 716.4, 717.01, 718.05, 718.02

[56] References Cited

U.S. PATENT DOCUMENTS

| | | | |
|---|---|---|---|
| 2,846,959 | 8/1958 | Perry | 105/374 |
| 3,861,110 | 1/1975 | Bartlett | 52/718.05 |
| 3,865,358 | 2/1975 | Butters | 293/128 X |
| 4,405,272 | 9/1983 | Wollar | 411/45 X |
| 4,489,465 | 12/1984 | Lemkin | 411/508 X |
| 4,555,885 | 12/1985 | Raymond et al. | 52/288 X |
| 4,946,727 | 8/1990 | Kessler | 52/718.05 X |
| 4,964,347 | 10/1990 | Long et al. | 105/355 X |
| 5,085,545 | 2/1992 | Takahashi | 411/45 |
| 5,096,753 | 3/1992 | McCue et al. | 52/288 X |

*Primary Examiner*—Robert J. Oberleitner
*Assistant Examiner*—S. Joseph Morano
*Attorney, Agent, or Firm*—Lloyd L. Zickert

[57] ABSTRACT

A gap sealer for covering the gaps between horizontally extending and vertically spaced apart sidewall panels on auto rack railroad cars and between sidewall panels and the floor, roof or vertical posts. The gap sealer is a single piece of extruded plastic having a head attachable to a flange of a sidewall panel and a tail or flap biasing against the flange of a vertically adjacent sidewall panel, the floor, roof or post, such that the body of the gap sealer covers the gap to prevent air passage. The gap sealer may also include a bumper which protects vehicle doors from contacting the sidewall panels and risking damage. An individual bumper may also be used to protect vehicle doors, and be attached to a sidewall panel by a unique fastener.

17 Claims, 10 Drawing Sheets

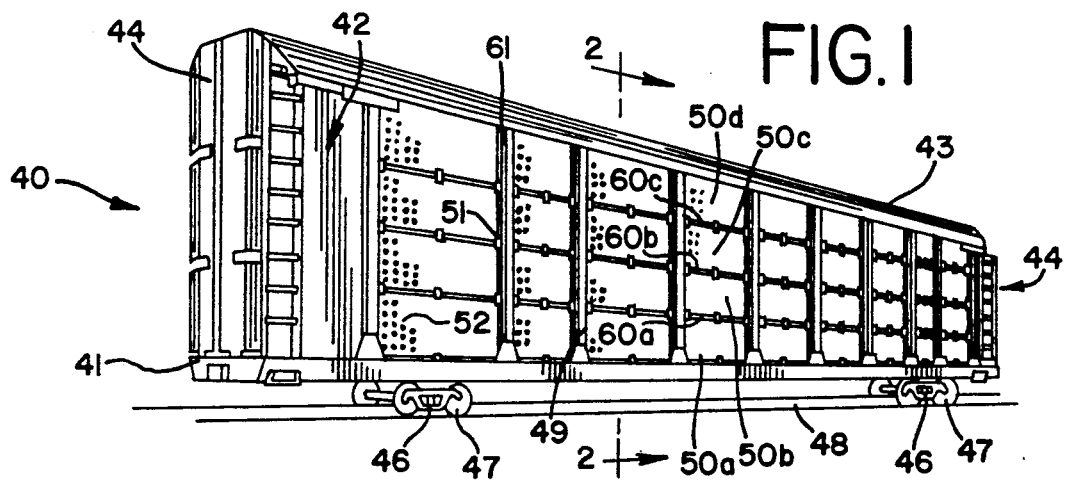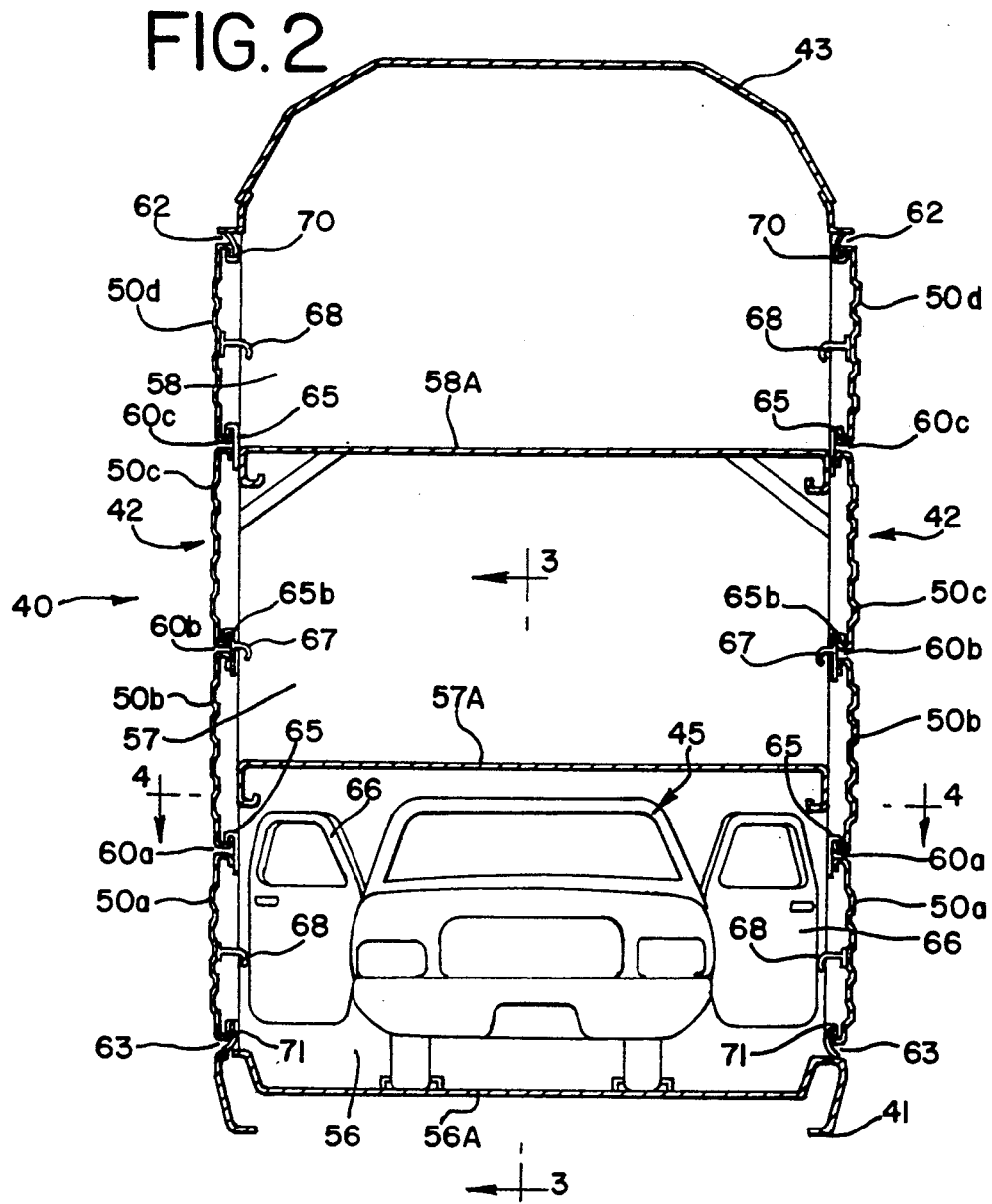

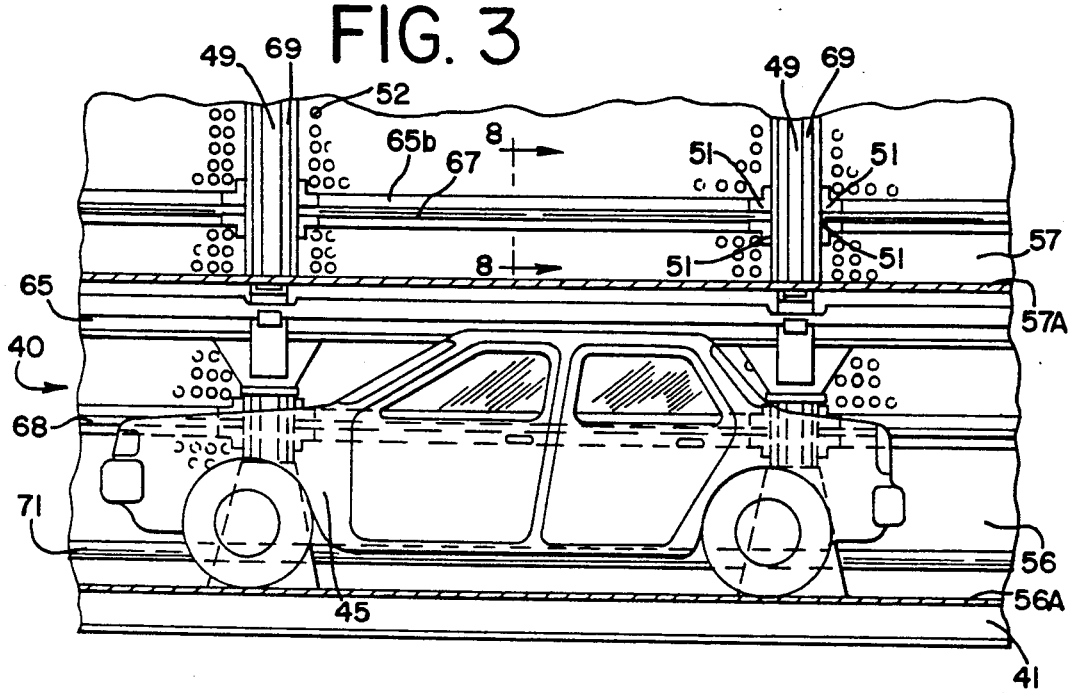
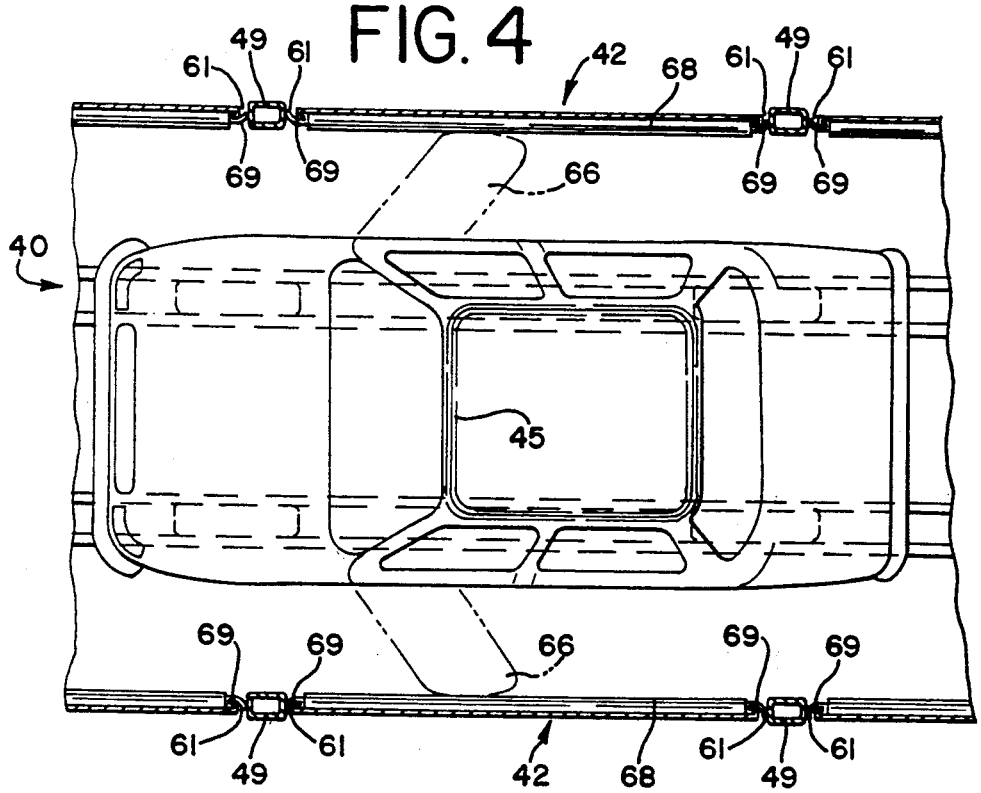

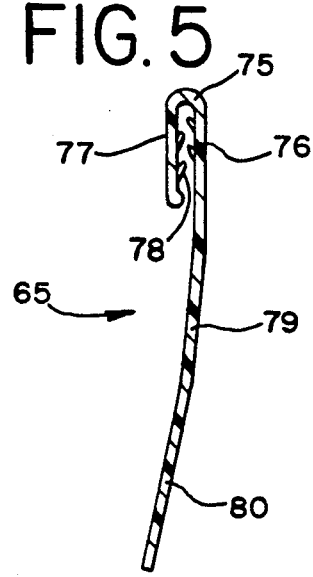
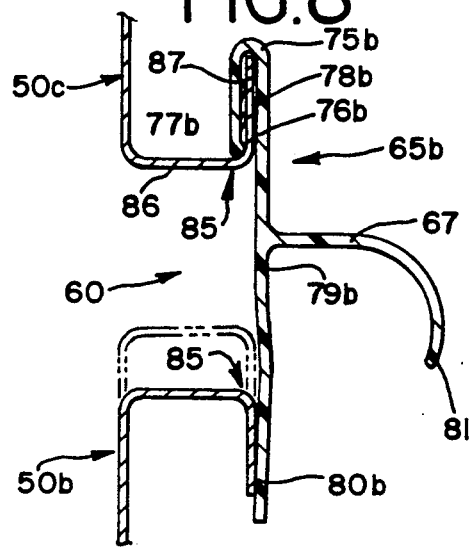
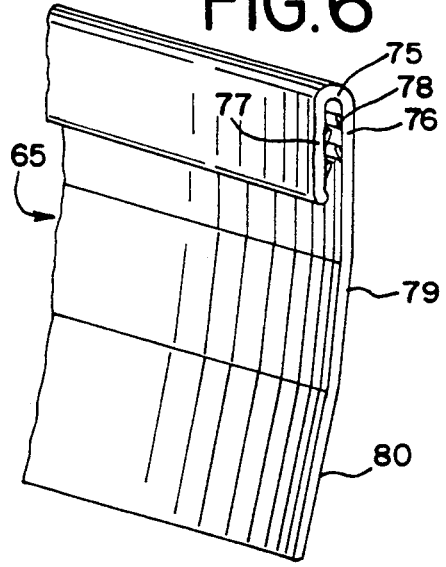
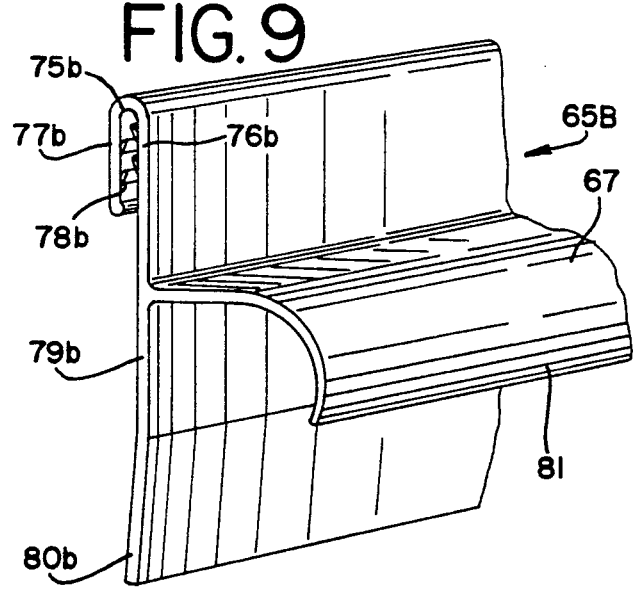
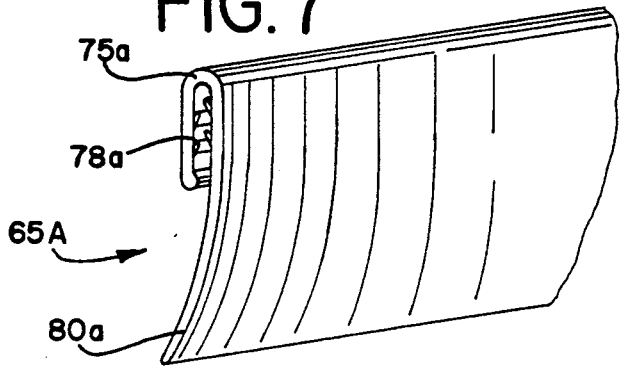

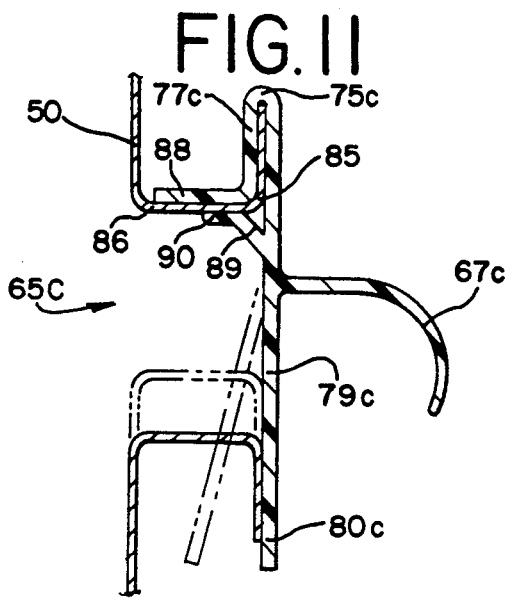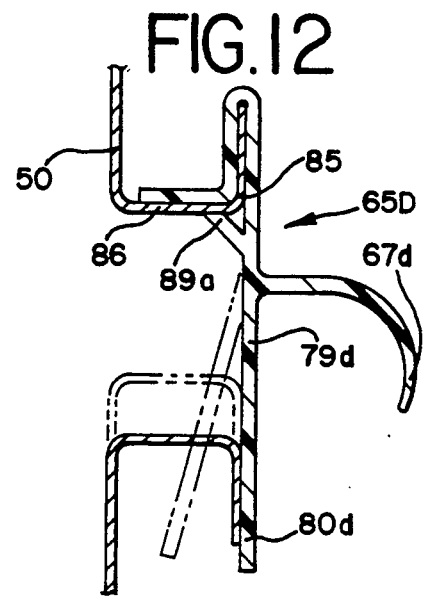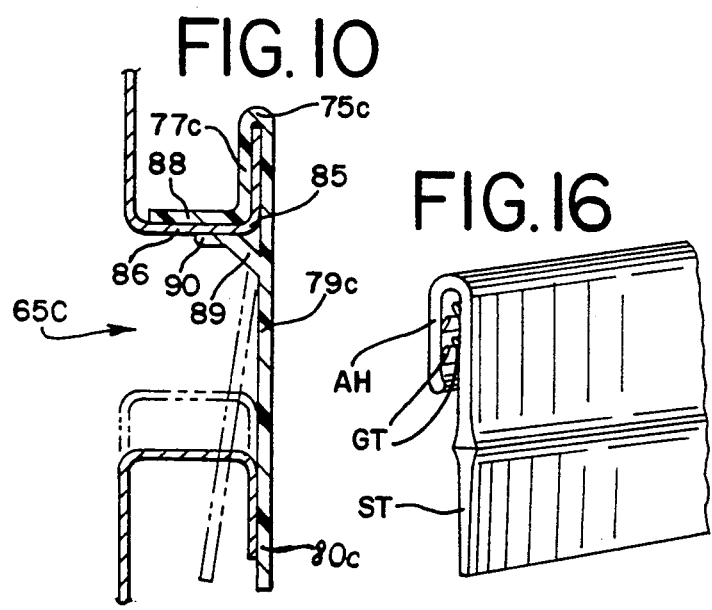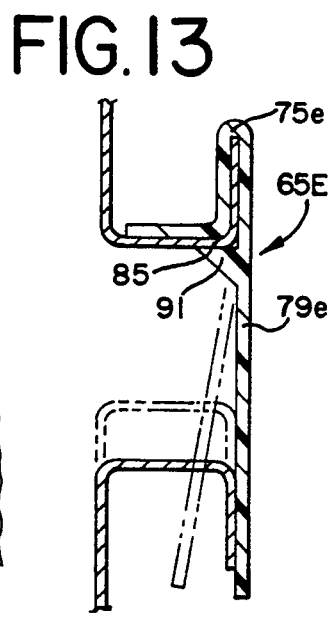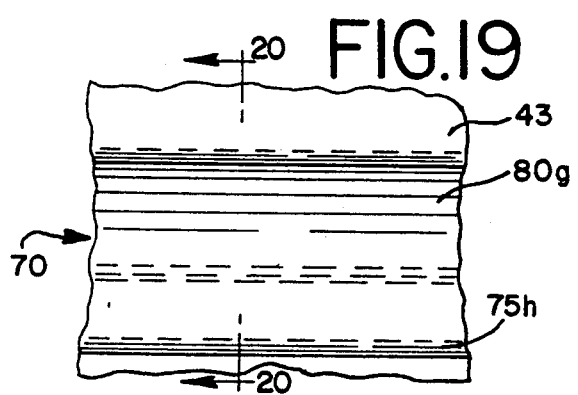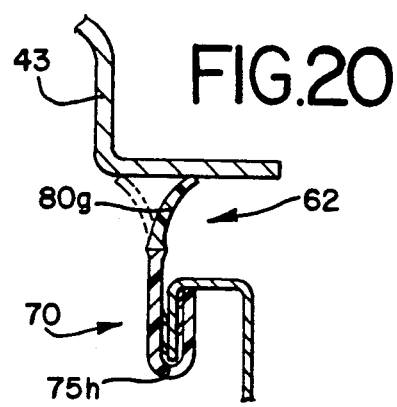

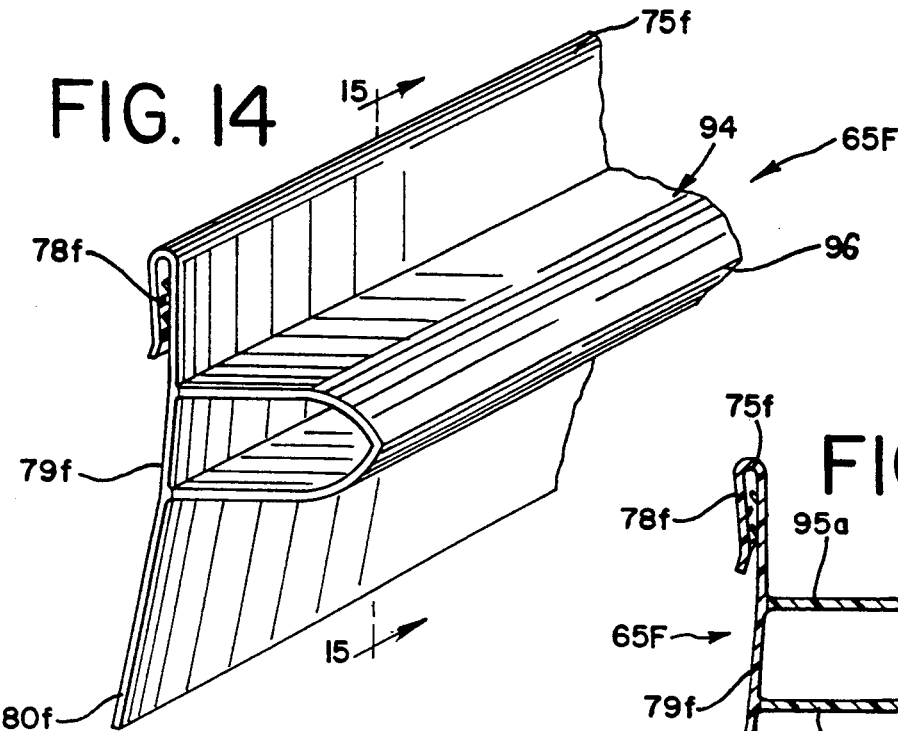
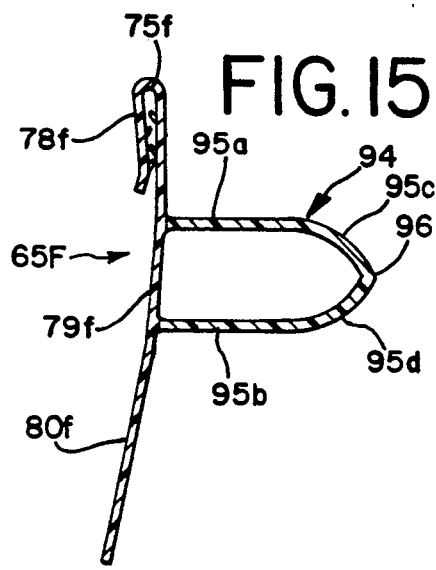
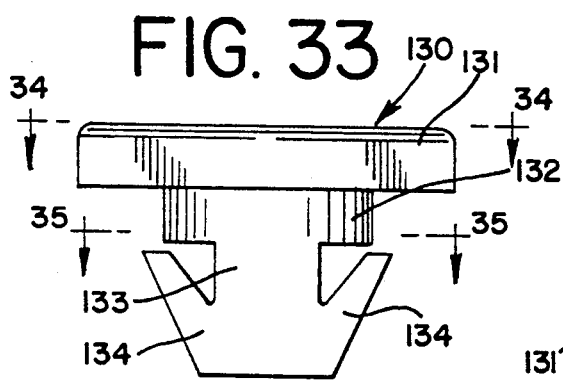
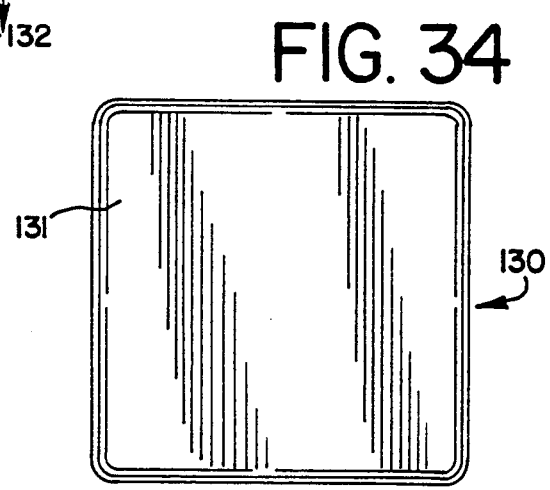
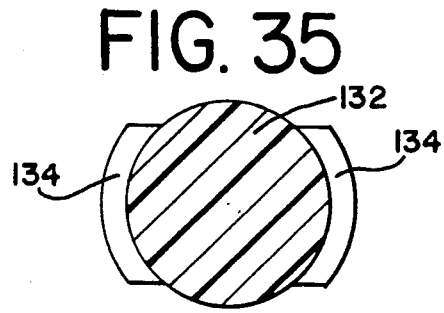

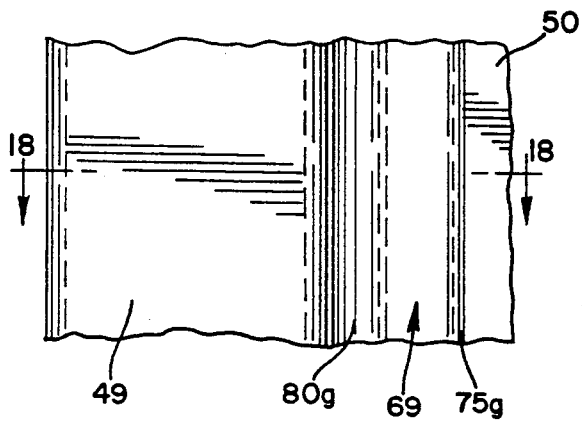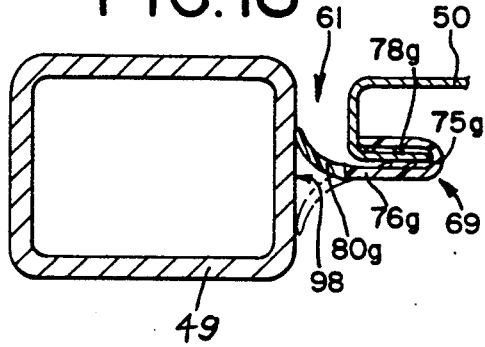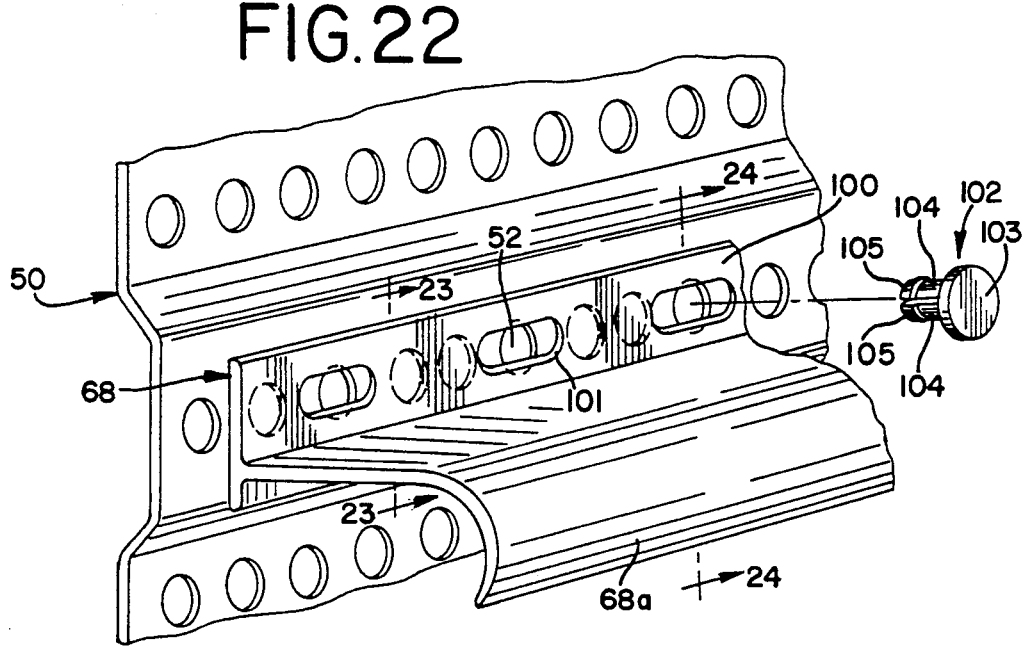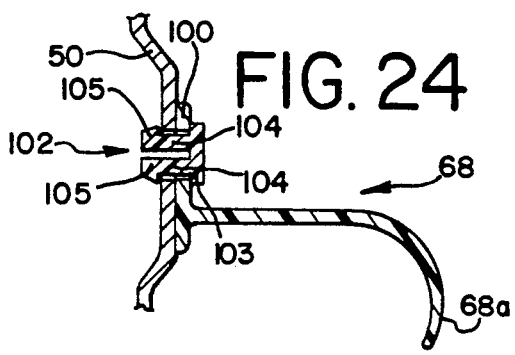

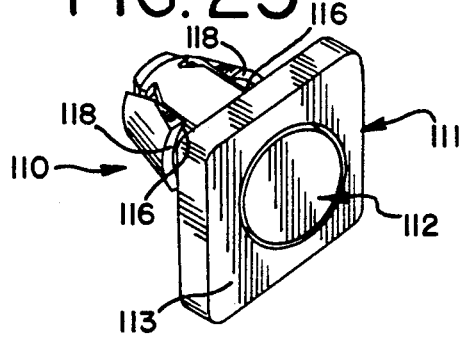
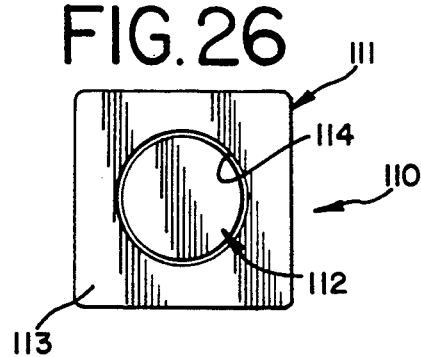
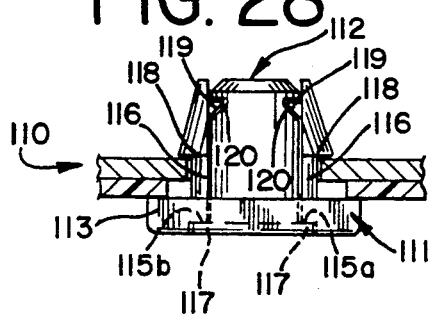
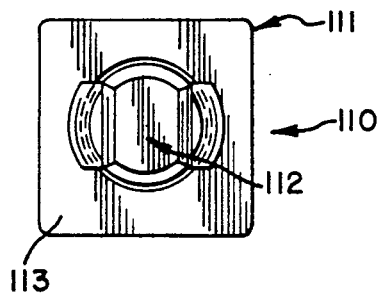
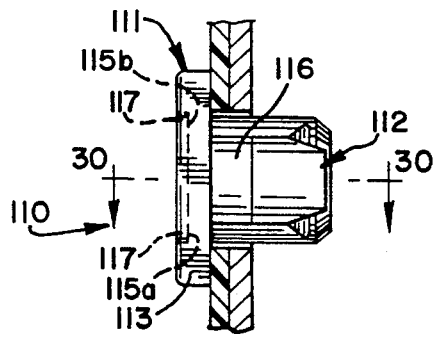
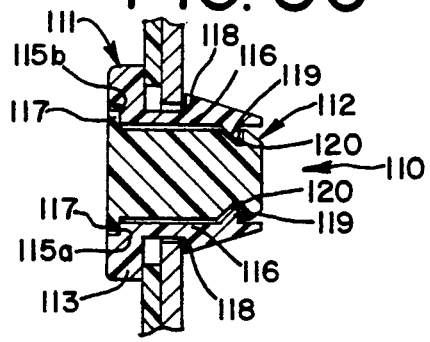
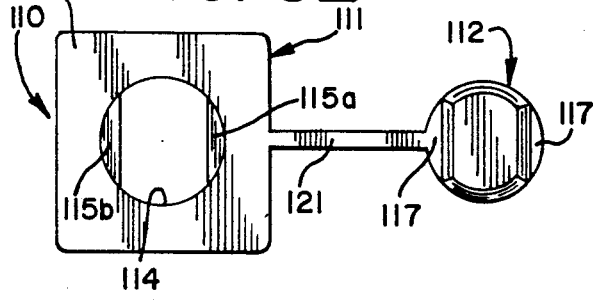
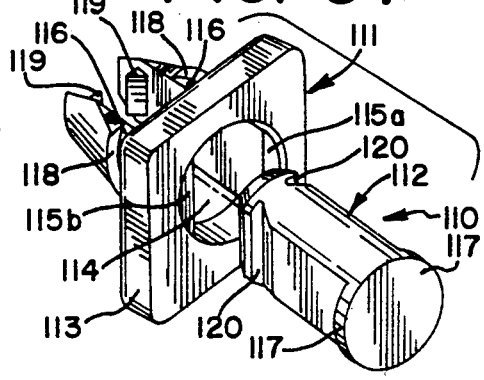

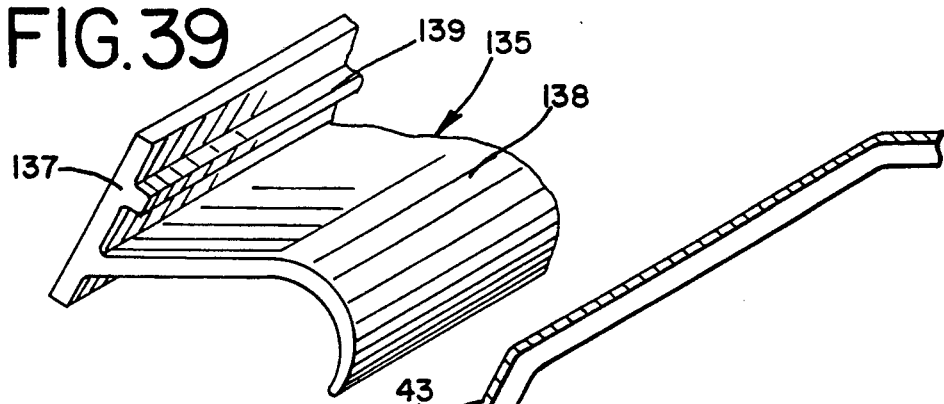
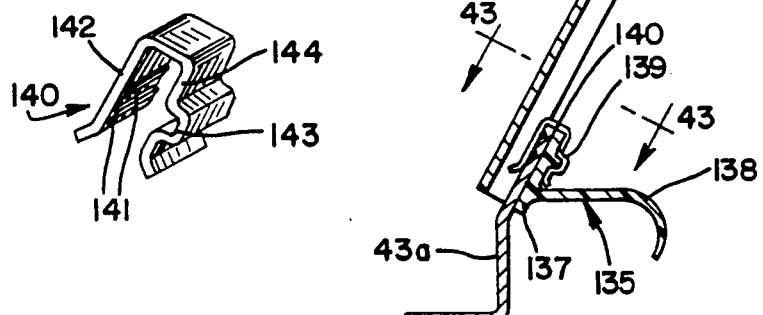
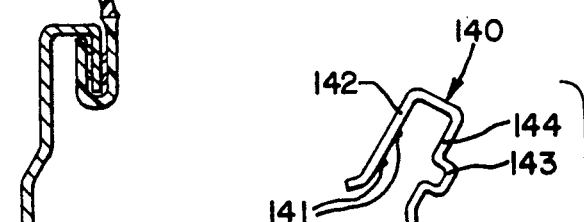
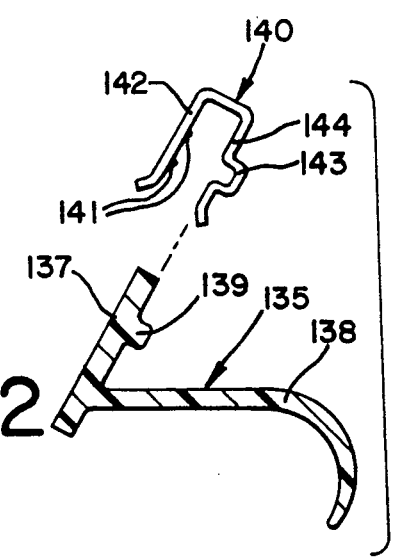
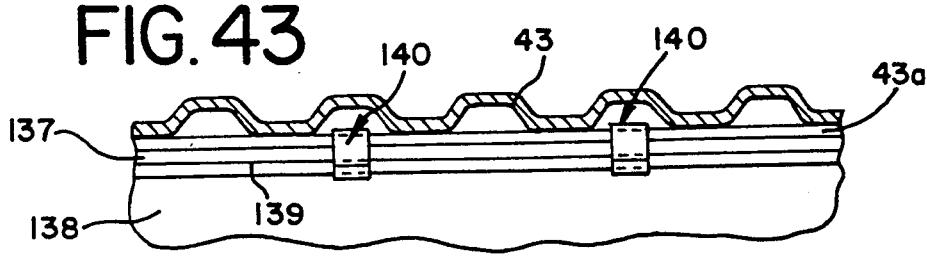

AUTO RACK PANEL GAP SEALER AND BUMPER

DESCRIPTION

This invention relates in general to a gap sealer for closing air gaps in auto rack railroad cars to protect the vehicles being transported from being damaged by air-carried contaminants, and more particularly to a device for covering, closing, and sealing the gaps or openings between the sidewall panels of an auto rack railroad car and/or the sidewall panels and supporting members.

BACKGROUND OF THE INVENTION

Heretofore, it has been common practice to transport newly manufactured vehicles, including automobiles, vans, and trucks, made in this country or imported into this country on auto rack equipped railroad cars. The transportation of newly manufactured vehicles by railroad is usually over long distances above three hundred miles. For example, domestic vehicles manufactured in the mid-west are transported to the west coast, or in another example, imported vehicles manufactured abroad which arrive on the west coast are transported to midwestern cities. A train having auto rack equipped railroad cars, known in the industry as auto rack cars, can take several days to reach its destination while traveling over thousands of miles through varying terrain. These trains also travel throughout the year enduring the severest of winter and summer weather as well as other environmental and man-made conditions. The period of travel, terrain, weather, environmental and man-made conditions are important because of the typical construction of the auto rack cars in which the newly manufactured vehicles are transported.

The typical auto rack car is compartmented, having two or three floors, two side walls, doors in front and back, and a roof. The side walls are constructed of numerous sidewall panels made of galvanized steel which are attached between vertical posts that are spaced evenly throughout the length of the auto rack car. However, these sidewall panels are installed with: significant gaps between the vertically adjacent sidewall panels, gaps between the vertical posts and the sidewall panels, gaps between the roof and the sidewall panels, and gaps between the floor and the sidewall panels. These gaps permit the entry of rapidly moving air into the auto rack car and thus onto the newly manufactured vehicles being stored in transit. This rapidly moving air entering the auto rack car carries contaminants, such as iron oxide, smoke or exhaust from the railroad engine, metal filings or shavings from the railroad tracks, dirt or sand carrying chemicals such as fertilizer, acid rain, and other precipitation-containing contaminants, all of which can damage the finishes of the newly manufactured vehicles. This damage can be so extensive that the manufacturer has to repaint or refinish the vehicles. Attempts to close these gaps with tape have not been successful.

Another closely related and significant problem is the damaging of a newly manufactured vehicle door's finish in the auto rack cars. Newly manufactured vehicles are loaded into the auto rack car by a person who drives the vehicle into the auto rack car. After correctly positioning the vehicle, the person must open the vehicle door to exit the vehicle. When the vehicle door is opened, it often comes in contact with the sidewall panels and/or the roof because there is only a limited amount of space between the vehicle and the side walls on any level or the vehicle and roof on the upper level of the auto rack car. This metal-to-metal contact can and often does scratch, dent, and/or damage the finish of the newly manufactured vehicle's doors.

One method which has been used to solve the door damage problem is the application of mastic-backed tape over the sidewall panel as a guard for the vehicle doors. This method has been unsuccessful for several reasons. First, the surfaces of the sidewall panel which contact the adhesive side of the tape must be specially cleaned before the tape is applied. Otherwise, the tape will not properly adhere to the panels. Second, the extreme changes in temperature and the constant abuse from the sun and other elements of nature cause the tape to deteriorate and peel away. Third, the tape can be used only one time. Fourth, and finally, because the sidewall panels are taken off the auto rack car approximately every eight years to be regalvanized, the tape and any adhesive left on the panels must be completely removed. The tape and adhesive must be scraped off and/or removed by a special solvent. This removal process is difficult, costly, and time-consuming. Therefore, the application of tape to protect the vehicle doors does not solve the problem.

Another method which has been used to prevent the vehicle doors from contacting the sidewall panels is to horizontally stretch a nylon belt across the sidewall panels and attach the ends of the belts to each end of the auto rack cars, approximately eighty feet apart. However, this method has been unsuccessful even with the addition of guides which are glued or welded to the vertical posts. The stretching of nylon belts between the two ends of the auto rack cars causes the belt to lose tension. This loss in tension causes the nylon belt to sag. When the nylon belt sags, it does not prevent the vehicle door from contacting the sidewall panels. To solve this problem, the nylon belt has to be constantly retensioned by ratchet tightening at one end of the auto rack car. Eventually, the nylon belts become completely stretched out and must be replaced. Accordingly, this method does not solve the problem.

A further method which has been used to prevent the vehicle doors from contacting the sidewall panels is to horizontally strap a rubber hose across the length of the auto rack car. However, this method has been unsuccessful because the rubber hose sags, because the straps holding the rubber hose often break, and because the hose does not sufficiently cover the sidewall panels. Thus, this method also fails to solve the problem.

Other methods such as attaching large rubber mats to the sidewall panels and coating the sidewall panels with a thin layer of spray-on foam have similarly failed to provide adequate protection for the newly manufactured vehicle doors.

SUMMARY OF THE INVENTION

The present invention overcomes the contamination problem in providing a gap sealer that is easily attachable to a sidewall panel and which covers, closes, and seals the gap between the adjacent horizontal edges of the sidewall panels. The present invention also overcomes the air-carried contaminant problem in providing a roof gap sealer which covers, closes, and seals the gap between a sidewall panel and the roof, in providing a post gap sealer which covers, closes, and seals the gap between a sidewall panel and a vertical post, and in providing a floor gap sealer which covers, closes, and seals the gap between a sidewall panel and the floor. Further, the invention contemplates a roof gap sealer for sealing between the uppermost panels and the roof. By sealing these gaps, the inside of the auto rack car is sufficiently protected from the entry of high-velocity air which carries damaging contaminants.

The gap sealer of the present invention is a single piece of plastic, such as vinyl, or other suitable material which is extruded into a preformed shape. The gap sealer includes an attaching head, a covering body, and a sealing tail. The attaching head secures the gap sealer to a flange at the edge of one of the sidewall panels. The covering body covers the gap between the sidewall panel to which the attaching head is mounted and the adjacent vertically mounted sidewall panel. The sealing tail is preformed in an angular position such that when the gap sealer is mounted, it biases against the sidewall panel opposite to which the attaching head is attached.

The gap sealer of the present invention can also be made with an integral bumper. The bumper is co-extruded into a preformed shape and is less rigid than the gap sealer. The bumper extends from the covering body into the auto rack car such that when a vehicle door is opened, the vehicle door contacts the bumper instead of the sidewall panels and/or the roof. It should be appreciated that the gap sealer, with or without the bumper, could be made from individual but connected parts.

Thus, the door-damage problem is overcome by providing a bumper connected to the gap sealer which extends sufficiently from the gap sealer into the inside of the auto rack car so as to prevent a vehicle door from contacting the sidewall panels. This bumper can also be formed as a separate device, namely, a bumper guard, apart from the gap sealer by being attached to a sidewall panel at a height such as to engage a vehicle door and prevent damage to the door. This separate bumper guard protects the vehicle door when the gap between the adjacent horizontal sidewall panels is not at the same height as the vehicle door. The present invention also includes a roof bumper guard which protects the vehicle door from contacting the roof.

The separate bumper guard of the present invention is also a single piece of plastic, such as vinyl or polyethylene, or other suitable material which is extruded into a preformed shape. The bumper guard includes a mounting base which has slots for the insertion of a fastener, and a bumper which prevents the vehicle door from contacting the sidewall panels. Numerous types of fasteners can be inserted in the slots of the mounting base and through the sidewall panel holes, thereby securing the bumper guard to the sidewall panel.

It is therefore an object of the present invention to provide a gap sealer which covers, closes, and seals different size gaps between two vertically adjacent horizontally extending sidewall panels on an auto rack car, thereby preventing air-carried contaminants from damaging the finishes of newly manufactured vehicles being transported in auto rack cars.

Another object of the present invention is to provide a gap sealer which does not inhibit the movement of the panels caused by expansion or contraction due to temperature changes or by movement of the auto rack cars in transit while continuing to close the gap between panels.

Another object of the present invention is to provide a gap sealer which is mounted on the inside of the auto rack car, and is therefore partially protected from ultraviolet attack.

Another object of the present invention is to provide a gap sealer which may be easily installed from the inside of the auto rack car, thereby eliminating the need for scaffolding, ladders, or other such equipment in the installation which ultimately reduces overall installation time and increases safety.

Another object of the present invention is to provide a gap sealer which may be easily snapped onto a sidewall panel and can be removed from the panel.

Another object of the present invention is to provide a gap sealer which requires little if any maintenance.

Another object of the present invention is to provide a gap sealer which can be reused.

Another object of the present invention is to provide a gap sealer which does not significantly deteriorate when exposed to the elements and extreme temperatures over extended periods of time.

Another object of the present invention is to provide a gap sealer made of a material that may be recycled.

Another object of the present invention is to provide a gap sealer with a bumper having the above advantages and whereby the bumper protects the vehicle doors from contacting the sidewall panels of an auto rack car.

Another object of the present invention is to provide a gap sealer with a bumper having the above advantages whereby the bumper extends far enough to catch any style vehicle door from subcompact car to a large van, sedan or pickup truck.

Another object of the present invention is to provide a gap sealer with a bumper having the above advantages whereby the bumper is relatively soft and will cause no harm to a person who contacts it.

Another object of the present invention is to provide a post gap sealer which covers, closes, and seals the different size gaps between a vertical post and the sidewall panel on an auto rack car, thereby significantly reducing the amount of air-carried contaminants from entering the auto rack car.

Another object of the present invention is to provide a roof gap sealer which covers, closes, and seals the gap between the roof and the sidewall panels on an auto rack car, thereby eliminating air containing contaminates from entering the auto rack car.

Another object of the present invention is to provide a floor gap sealer which covers, closes, and seals the gap between the floor and the sidewall panels on an auto rack car, thereby eliminating air containing contaminants from entering the auto rack car.

Another object of the present invention is to provide a separate bumper guard that prevents metal-to-metal contact of a vehicle door and the side walls of an auto rack car when the vehicle door is opened by a person entering or exiting the vehicle during loading or unloading.

Another object of the present invention is to provide a separate roof bumper guard that prevents metal-to-metal contact of a vehicle door and the roof of an auto rack car when the vehicle door is opened by a person entering or exiting the vehicle during loading and unloading.

Another object of the present invention is to provide a fastener for attaching the sidewall bumper guards, wherein the fastener is one piece and may be easily applied without the use of special tools and will securely fasten the guard in place.

Another object of the present invention is to provide a fastener for attaching the sidewall bumper guards, wherein the fastener is two pieces and may be easily applied without the use of special tools and will securely fasten the guard in place.

Other objects, features and advantages of the invention will be apparent from the following detailed disclosure, taken in conjunction with the accompanying sheet of drawings, wherein like reference numerals refer to like parts.

DESCRIPTION OF THE DRAWINGS

FIG. 1 is a perspective view of a typical auto rack car having a series of vertical posts on each side wall and four sidewall panels horizontally extending and vertically mounted between each pair of adjacent vertical posts;

FIG. 2 is a cross-sectional view of the tri-level auto rack car taken substantially along line 2—2 in FIG. 1 showing the placement of the gap sealer, the gap sealer with a bumper, the separate bumper guard, the roof gap sealer, and the floor gap sealer;

FIG. 3 is a fragmentary cross-sectional view of the tri-level auto rack car taken substantially along line 3—3 in FIG. 2 showing the placement of the gap sealer, the gap sealer with a bumper, the post gap sealer, and the floor gap sealer;

FIG. 4 is a fragmentary cross-sectional view of the tri-level auto rack car taken substantially along line 4—4 in FIG. 2 showing the placement of the post gap sealer and the open vehicle doors contacting the separate bumper guard;

FIG. 5 is a cross-sectional view of the gap sealer illustrating the angles of the covering body and the sealing tail;

FIG. 6 is a fragmentary perspective view of the gap sealer prior to mounting, illustrating the side that mates with the sidewall panels;

FIG. 7 is a fragmentary perspective view of the gap sealer prior to mounting, illustrating the curved covering body and sealing tail;

FIG. 8 is a cross-sectional view of the gap sealer with a bumper mounted on a sidewall panel and taken substantially along line 8—8 in FIG. 3;

FIG. 9 is a fragmentary perspective view of the gap sealer with a bumper prior to mounting, illustrating the side that has the bumper and which faces the inside of the auto rack car;

FIG. 10 is a cross-sectional view of another embodiment of the gap sealer without a bumper mounted on a sidewall panel;

FIG. 11 is a cross-sectional view of the embodiment of the gap sealer of FIG. 10 with a bumper mounted on a sidewall panel;

FIG. 12 is a cross-sectional view of a further embodiment of the gap sealer with a bumper mounted on a sidewall panel;

FIG. 13 is a cross-sectional view of another embodiment of the gap sealer without a bumper mounted on a sidewall panel;

FIG. 14 is a perspective view of another embodiment of the gap sealer with a bullet bumper;

FIG. 15 is a cross-sectional view of the embodiment of the gap sealer with a bullet bumper of FIG. 14;

FIG. 16 is a perspective view of a further sealing member of the invention prior to installation which can serve as a post gap sealer, a roof gap sealer, or a floor gap sealer;

FIG. 17 is a fragmentary elevational view of the sealing member of FIG. 16 as seen from the inside of the car serving as a post gap sealer and shown mounted on an edge of a sidewall panel and biasing against a vertical post;

FIG. 18 is a cross-sectional view of the post gap sealer taken substantially along line 18—18 of FIG. 17;

FIG. 19 is a fragmentary elevational view of the sealing member of FIG. 16 as seen from the inside of the car serving as a roof gap sealer and shown mounted on an edge of a sidewall panel;

FIG. 20 is a vertical sectional view of the roof gap sealer taken substantially along line 20—20 of FIG. 19;

FIG. 22 is a fragmentary perspective view of a separate bumper guard positioned on a sidewall panel and showing the exploded view of a fastener for attaching the bumper guard to the panel;

FIG. 23 is a vertical cross-sectional view of the bumper guard of FIG. 22 taken substantially along line 23—23 of FIG. 22;

FIG. 24 is a vertical cross-sectional view of the bumper guard of FIG. 22 taken substantially along line 24—24 of FIG. 22 and showing a fastener in place;

FIG. 25 is a perspective view of an assembled two-part fastener according to the invention for attaching the bumper guard to the sidewall panel;

FIG. 26 is a front view of the fastener of FIG. 25;

FIG. 27 is a rear view of the fastener of FIG. 25;

FIG. 28 is a top view of the fastener of FIG. 25 in mounted position with the panel and guard shown in cross section and more clearly showing the locking body and locking stud parts of the fastener;

FIG. 29 is a side view of the fastener of FIG. 25 in mounted position with the panel and guard shown in cross section;

FIG. 30 is a cross-sectional side view of the fastener of FIG. 25 taken substantially along line 30—30 of FIG. 29;

FIG. 31 is an exploded perspective view of the fastener of FIG. 25;

FIG. 32 is a front view of a fastener like that in FIG. 25 illustrating a modification where the locking stud and the locking body are integrally connected by a flexible link to facilitate handling;

FIG. 33 is a side view of a one-piece fastener according to the invention for attaching the bumper guard to the sidewall panel;

FIG. 34 is a front view of the fastener of FIG. 33;

FIG. 35 is a rear view of the fastener of FIG. 33;

FIG. 39 is a perspective view of a further bumper member of the invention prior to installation which serves as a roof bumper guard;

FIG. 40 is a perspective view of a spring clamp or clip used to attach the roof bumper guard of FIG. 39 to the roof;

FIG. 41 is a cross-sectional view of the roof bumper guard and the spring clamp as mounted on the roof;

FIG. 42 is a cross-sectional exploded view of the roof bumper guard and the spring clamp;

FIG. 43 is a top cross-sectional view taken substantially along line 43—43 of FIG. 41 to show the spaced spring clips for mounting the roof bumper guard.

DESCRIPTION OF THE INVENTION

Figure 21:
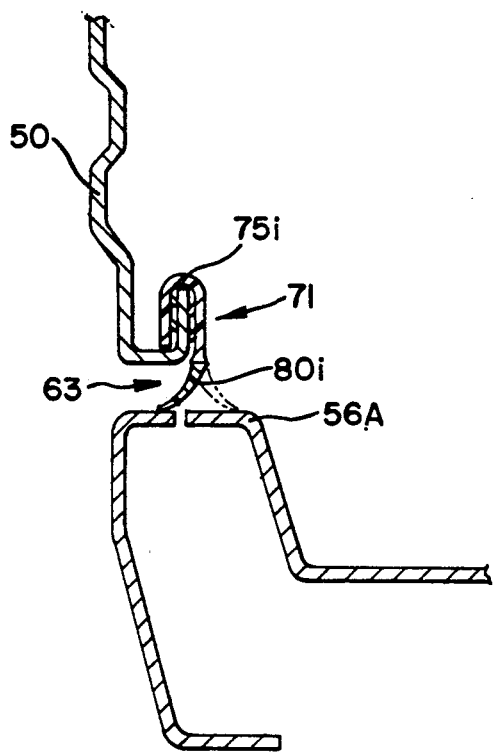
FIG. 21 is a greatly enlarged cross-sectional view of the floor gap sealer mounted on the lowermost sidewall panel and biasing against the floor.

The gap sealer of the present invention solves the problem of damage to the finishes of newly manufactured vehicles being transported in auto rack cars by significantly reducing the flow of air-carried contaminants into the auto rack car and across the vehicles. There are approximately 40,000 auto rack cars which are designed with varying size gaps between adjacent sidewall panels, between sidewall panels and the vertical posts, between the sidewall panels and the roof, and between the sidewall panels and the floor. Contaminants in the air enter the auto rack cars through these gaps and settle on and damage the finishes of the newly manufactured vehicles. This damage can be so extensive that the vehicles have to be repainted. Thus, several vehicle manufacturers are requiring the railroad industry to find a way to reduce this damage. The present invention prevents this damage by providing a gap sealer to the sidewall panels to cover, close, and seal these gaps on an auto rack car and significantly reduce air-flow velocity, thereby decreasing damage to vehicles caused by subjecting the vehicles to airborne contaminants.

The gap sealer of the present invention is a single piece of extruded plastic, such as polyvinyl chloride (PVC), which attaches to a sidewall panel, covers a gap between that sidewall panel and a vertically adjacent sidewall panel, and biases against the adjacent sidewall panel in substantially sealing relation to prevent air from entering the auto rack car through that gap. The gap sealer has an attaching head for firm and easy attachment of the sealer to the flange of the sidewall panel. Connected to this attaching head is a covering body which is sized to cover the gap. Finally, connected to the covering body is a sealing tail which biases against the adjacent sidewall panel, thereby sealing with the adjacent panel. The post gap sealer, roof gap sealer, and the floor gap sealer are similarly constructed.

Additionally, a bumper can be added to extend from the covering body into the auto rack car. This bumper cushions doors to avoid door damage by preventing a vehicle door from contacting the sidewall panels. The bumper extends substantially perpendicular to the covering body into the vehicle compartment of the auto rack car. The end of the bumper bends downwardly and tapers to an end. This bumper is made of a flexible material so that when a vehicle door contacts the bumper, the force of the vehicle door is absorbed and the door is prevented from contacting the sidewall panels, thereby avoiding any damage. A separate bumper guard or a roof bumper guard, unattached to a gap sealer, which prevents the vehicle door from contacting the sidewall panel and/or the roof can also be utilized where needed to protect the door against striking the metal sidewall panels.

Referring to the drawings, and particularly to FIGS. 1 to 4, a typical auto rack car 40 includes a frame 41 which supports two side walls 42 and a roof 43. On the opposite ends of the auto rack car 40 are two pairs of doors 44, one pair on each end. These doors 44 are opened during the loading and unloading of vehicles 45. The frame 41 is supported on trucks 46, each of which have several wheels 47 which roll along railroad tracks 48. The side walls 42 include a series of steel vertical posts 49 which are mounted on and extend upwardly from the frame 41. The roof 43 is mounted on and supported by these vertical posts 49. The vertical posts 49 are evenly spaced along the entire length of both sides walls 42 of the auto rack car 40. A plurality of rectangular galvanized steel sidewall panels 50 which extend horizontally and are vertically spaced apart are mounted between each pair of vertical posts 49. These sidewall panels 50 are supported at their corners by brackets 51 that are suitably secured to the vertical posts 49. The average sidewall panel 50 has a multiplicity of round sidewall panel holes 52 that are approximately five-eights of an inch in diameter. These sidewall panel holes 52 provide the auto rack car 40 with natural light as well as proper ventilation. Proper ventilation is critical because it prevents harm from the toxic vehicle fumes to the person or persons loading or unloading the vehicles 45 into or out of the auto rack car 40.

The auto rack car 40 in FIG. 2 is a tri-level car having first, second, and third levels 56, 57 and 58. The first level 56, the second level 57, and the third level 58 include floors 56A, 57A and 58A, respectively, on which the vehicles 45 are supported. Normally, eighteen passenger vehicles can be transported in a tri-level auto rack car, six on each level.

The sidewall panels 50 are individually attached by the brackets 51 to the vertical posts 49 at each corner of the sidewall panel 50 such that horizontally extending gaps 60a, 60b and 60c exist between adjacent sidewall panels. The sidewall panel gap 60a on the first level 56 is the space between the lower two adjacent horizontally mounted sidewall panels 50a and 50b; the sidewall panel gap 60b on the second level 57 is the space between sidewall panels 50b and 50c; and the sidewall panel gap 60c on the third level 58 is the space between sidewall panels 50c and 50d. These sidewall panel gaps 60a, 60b and 60c generally vary in size from about one and a half inches to two and a half inches, depending on the original construction, movement, and thermal expansion of the auto rack cars.

Vertically extending gaps 61 are disposed between the sidewall panels and the vertical posts, as illustrated in FIG. 4. The vertically extending gaps 61 range from approximately one-half inch to one inch, depending on the original construction, movement, and thermal expansion of the auto rack cars. As illustrated in FIG. 4, there are two vertically extending gaps 61, one on each side of the vertical post 49 and at each end of each sidewall panel.

A roof gap 62 is defined between the uppermost sidewall panel 50 and the roof 43. The roof gap 62 ranges from one-half inch to two and a half inches, also depending on the original construction, movement, and thermal expansion of the auto rack cars.

A floor gap 63 is defined between the lowermost sidewall panel 50 and the floor 56a of the first level 56, as illustrated in FIG. 2. The floor gap 63 ranges from one-half inch to two and one-half inches, likewise depending on the original construction, movement, and thermal expansion of the auto rack car.

The auto rack car 40 is constructed with these gaps for several reasons. The sidewall panels 50 and the vertical posts 49 are galvanized steel. Hence, the sidewall panels 50 and the vertical posts 49 expand as the temperature increases and contract as the temperature decreases. The construction of the sidewall panels allows for this thermal expansion and contraction. Furthermore, the auto rack car 40 is constantly shimmying, swaying, twisting, and rocking when in transit. The construction of the vertical posts 49 and the attachment of the sidewall panels 50 allow for this movement without structural damage to the entire car 40. To date, there are approximately 40,000 auto rack cars constructed in this manner and they continue to be manufactured in this manner.

The vertically extending gaps 61, the roof gaps 62, the floor gaps 63, and especially the sidewall panel gaps 60, permit the entry of a significant amount of high-velocity air flow into and essentially throughout the auto rack car 40. On the other hand, the sidewall panel holes 52 do not permit the entry of a significant amount of high-velocity air flow into and throughout the auto rack car 40. The air flow generally passes over the sidewall panel holes, and any contaminants in air flowing through the holes usually drop immediately to the floor because the air's velocity is so low. Controlling the velocity of air that enters and flows throughout the auto rack cars 40 is important because air carries contaminants which can damage the finish of the newly manufactured vehicles 45.

There are numerous types of contaminants in the air. One particularly harmful type of contaminant is the tiny metal particles which are produced when the wheels 47 of the auto rack car 40 move along the railroad tracks 48. The wheels 47 are generally made of a relatively harder steel than the railroad tracks 48. When the relatively harder wheels 47 roll along the relatively softer railroad tracks 48, tiny metal particles are removed from the railroad tracks 48. Further, tiny particles are produced during braking by the wheels and the brake pads. Many of these tiny metal particles are carried by the air flow of the moving auto rack car 40 into and through the auto rack cars 40 mainly through the sidewall panel gaps 60, but also through the vertically extending gaps 61, the roof gaps 62, and the floor gaps 63. Once these metal particles enter the auto rack car 40 with a relatively high velocity air flow, they can settle upon the newly manufactured vehicles 45. Based on the temperature and humidity, these metal particles begin to corrode or rust and thereby damage the finishes of the newly manufactured vehicles 45. This is similar to the phenomenon that happens to vehicles which are parked close to railroad tracks on a regular basis.

Similarly, another type of contaminant is the rust particles from the sidewall panels 50. Although the steel sidewall panels 50 are galvanized, after prolonged use, the sidewall panels 50 begin to rust especially at the corners of the sidewall panel where the brackets directly contact the sidewall panels and thus produce air-borne rust particles. The rust particles are carried into the auto rack car 40 by the air and eventually settle on the newly manufactured vehicles 45 in transit. Like the tiny metal particles, the rust particles can damage the finish of the newly manufactures automobiles 45, depending on the temperature and humidity.

Another type of contaminant is the chemicals contained in the exhaust from the engine of the train, acid rain and other precipitation, and dirt or sand containing fertilizer and/or other chemicals. These chemical contaminants can also be carried by the high-velocity air flow into the auto rack car 40 through the sidewall panel gaps 60, vertically extending gaps 61, roof gaps 62, and floor gaps 63. Once in the auto rack car 40, these chemicals can settle on the newly manufactured vehicles 45 and tend to dull or damage their finishes.

Finally, a further contaminant is the moisture carried in the air which is carried into the auto rack cars 40. This moisture acts as a catalyst for the metal particles, the rust particles, and the chemicals mentioned above.

To reduce the entry of these contaminates into the auto rack car 40, the velocity of the air flow into and throughout the auto rack car 40 from the air gaps must be reduced. If the air flow inside of the auto rack car 40 is reduced to below a threshold level, the entry of such contaminates will be significantly reduced and the finishes of the newly manufactured vehicles 45 will be preserved.

As illustrated in FIGS. 2 and 3, a gap sealer 65 of the present invention, combined with or without a bumper 67, can be mounted on each set of vertically adjacent sidewall panels 50 thereby covering, closing, and sealing the sidewall panel gaps 60 and preventing the flow of air through these gaps and into the auto rack car 40. Specifically, on the second level 57 of the tri-level auto rack car 40, the sidewall panel gap 60b is located at approximately the same height as would be the vehicle door 66. Thus, on the second level 57 a gap sealer 65B integral with a bumper 67 can be used on both sides of the auto rack car 40 to cover, close, and seal the sidewall panel gap 60B as well as to protect the vehicle door 66 from contacting the sidewall panels 50.

On the other hand, on the first level 56 and the third level 58 of a tri-level auto rack car 40, the sidewall panel gaps 60a and 60c are not located at the approximate height of the vehicle door 66. Accordingly, a gap sealer 65 with a bumper 67 would not prevent a vehicle door 66 from contacting the sidewall panels 50. Thus, the problem of a vehicle door 66 contacting the sidewall panels 50 cannot be resolved by using a gap sealer 65B with a bumper 67 on the first and third levels. To resolve this problem, in addition to a gap sealer 65, a separate bumper guard 68 is attached to the sidewall panels 50 on both sides of the first level 56 and the third level 58 of the tri-level auto rack car 40. This bumper guard 68 is attached to the sidewall panel 50 at the appropriate height to prevent an opened vehicle door 66 from contacting the sidewall panel 50, and thereby preventing damage to the finish of the vehicle door 66.

The post gap sealer 69, the roof gap sealer 70, and the floor gap sealer 71 of the present invention are also shown in FIGS. 2, 3 and 4. The post gap sealer 69 is used on the auto rack car 40 to cover, close, and seal the vertically extending gap 61; the roof gap sealer 70 is used on the auto rack car 40 to cover, close, and seal the roof gap 62; and the floor gap sealer 71 is used on the auto rack car 40 to cover, close, and seal the floor gap 63.

It should be noted that FIGS. 2 and 3 illustrate one major advantage of the gap sealer 65, the gap sealer 65B with a bumper 67, the bumper guard 68, the post gap sealer 69, the roof gap sealer 70, and the floor gap sealer 71. These devices can be installed by a person inside of the auto rack car 40 standing on each of the different floors 56A, 57A and 58A. No scaffolding, ladders, or lifts are necessary on the outside of the auto rack car 40 to install these devices. This greatly increases safety and significantly reduces the time necessary to install these devices.

As illustrated in FIGS. 5 and 6, the gap sealer 65 has an attaching or clamping head 75 of substantially inverted U-shaped construction. This attaching head 75 has an inside wall 76 connected to an outside wall 77. Mounted on the inside wall 76 and facing the outside wall 77 are a series of gripping teeth 78 which run throughout the length of the attaching head 75. Mounted on the outside wall 77 and facing the inside wall 76 are also a series of gripping teeth 78 which run throughout the length of the attaching head 75. These gripping teeth 78 serve to grippingly secure the attaching head 75 to one of the sidewall panels. In fact, this attaching head 75 essentially snaps onto the sidewall panel, as described below. It should be appreciated that the shape and construction of these gripping teeth 78 could vary. It should also be appreciated that other methods of gripping the sidewall panel are possible.

The attaching head 75 is attached to a covering body 79. This covering body 79 is sized to cover and close the sidewall panel gap between two adjacent horizontally extending sidewall panels. By covering and closing the sidewall panel gap, the high-velocity air carrying contaminants cannot enter the auto rack car 40 through that gap. The covering body 79 extends from and is connected to the end of the inside wall 76. The lower part of the covering body 79 extends at approximately a five-degree angle from the inside wall for biasing purposes against the adjacent sidewall panel.

A sealing tail or flap 80 is attached to the covering body 79 at the end opposite the attaching head 75. This sealing tail 80 extends at an angle from the covering body 79. Specifically, the sealing tail 80 is constructed at approximately a seven degree angle from the plane in which the covering body 79 lies or at approximately a twelve-degree angle from the plane in which the inside wall 76 lies. These angles are formed when the gap sealer 65 is extruded. The sealing tail 80 and the covering body 79 are formed with these angles to bias against the sidewall panel which, when mounted, is vertically adjacent to the sidewall panel to which the attaching head 75 is mounted. This sealing tail 80 and the covering body 79 provide pressure to generally seal the gap sealer 65 when it is mounted on a panel because it is mounted against the angle and the memory of the material. Thus, it constantly exerts pressure by tending to return to its naturally formed extruded position. It should be appreciated that other angles, including zero-degree angles, for constructing the covering body and the sealing tail 80 can be used and such angles can depend on the rigidity of the material used as well as other factors.

The attaching or clamping head 75, the covering body 79, and the sealing tail 80 of the gap sealer 65 are preferably constructed from extrudable vinyl plastic with memory qualities, specifically a somewhat rigid polyvinyl chloride (PVC) having approximately an eighty D (80D) durometer hardness rating. However, it should be appreciated that PVC with other ratings and other materials with different ratings could be used to form the gap sealer. For instance, the gap sealer could also be made from an extrudable grade low-density polyethylene. It should also be appreciated that other suitable extrudable plastic materials, such as rubber or urethane, may be used in constructing the gap sealer. One advantage of using the PVC material is that it can be recycled.

The gripping teeth 78 of the gap sealer 65 are made from a flexible PVC having approximately a seventy-four A (74A) durometer hardness rating. The gripping teeth are thus made from a more flexible material than the rest of the gap sealer 65 because that material provides more friction on the sidewall panel flange and therefore grips the sidewall panel flange better. The teeth are co-extruded with the body of the gap sealer so that they are integral with the body.

The gap sealer 65 also has a UV inhibitor incorporated in a gray color containing one-tenth of one percent of a hindered amine light stabilizer. The UV inhibitor prevents the deterioration of the gap sealer 65 from ultraviolet rays. Other UV inhibitors could be used in the gap sealer 65. It should also be appreciated that since the gap sealer is mounted inside the auto rack car 40 instead of on the outside, it is partially protected from the damaging ultraviolet rays.

The gap sealer 65A can also be constructed such that the sealing tail 80a smoothly curves toward the outside wall, instead of having one or more bends which angle toward the outside wall, as illustrated in FIG. 7. In this embodiment, the construction of the attaching head 75a is similar to the attaching head 75 of gap sealer 65. This gap sealer 65A is also constructed from the same material as the gap sealer 65 including having gripping teeth 78a which are co-extruded with the rest of the gap sealer.

As illustrated in FIGS. 8 and 9, the gap sealer 65B includes a bumper 67 connected to the covering body 79b approximately mid-way between the attaching head 75b and the sealing tail 80b. The bumper 67 is of a tapered semi-rigid PVC member having approximately a fifty-five D (55D) durometer hardness rating, which projects from the covering body 79b at a substantially perpendicular angle. Thus, it is not as hard as the covering body and is therefore more flexible. The bumper 67 is generally arcuately shaped, tapered at its free end 81, and integrally extruded with the gap sealer. This tapered end absorbs the impact from a vehicle door. The gripping teeth 78b on the gap sealer 65B with the bumper 67 also have approximately a fifty-five D (55D) durometer hardness rating because it is economically practical that only two different types of material can be extruded in one machine. The construction of the gap sealer 65B with the bumper 67 allows a vehicle door to contact the bumper 67 and absorb any impact, instead of the sidewall panels, without harm to the finish of that vehicle door, as well as providing all of the closing, covering and sealing advantages of the gap sealer 65.

Referring to FIG. 8, the gap sealer 65B is illustrated as mounted on two adjacent upper and lower vertical sidewall panels 50b and 50c respectively. The sidewall panel gap 60 between the two sidewall panels, as previously mentioned, can range from about one and one-half to two and one-half inches. This variance in the size of the sidewall panel gap 60 is illustrated by the two positions of the lower panel 50b, one by the solid line and one in phantom. As such, it is necessary that the gap sealer 65B be of sufficient height to cover, close, and seal the sidewall panel gap 60 at its greatest width as well as its narrowest width. To compensate for this variance, the sealing flap slidably contacts the sidewall panel and thus can be used for all sidewall panel gaps whatever the size, as well as covering the gap when it changes because of weather or movement during traveling.

Each sidewall panel 50 is horizontally corrugated and has an L-shaped flange 85 extending around the periphery of each side. The construction of the gap sealer is based on the presence of the two adjacent flanges 85 of two adjacent vertically spaced sidewall panels 50. The L-shaped flange 85 has a first member 86 which is connected to the sidewall panel wall 50c and lies substantially perpendicular to the panel wall 50c. A second member 87 is connected to the first member 86 and extends substantially perpendicular to the first member 86 and is thus substantially parallel to the sidewall panel 50c. The attaching head 75b is mounted on the second member 87 of the flange 85. The space between the gripping teeth 78b on the inside wall 76b and the gripping teeth 78b on the outside wall 77b of the attaching head 75b is smaller than the width of the second member 87. When the attaching head 75b is slid onto the second member 87, the inside wall 76b and the outside wall 77b expand away from each other and once installed, due to the memory of the material, tend to move toward each other, thereby causing the teeth to frictionally grip the second member 87 of the flange 85 and thereby securing the gap sealer to the sidewall panel 50c. It should be appreciated that when the attaching head 75b is slid on the second member 87, a standard soap, silicon soap, or other lubricant may be used to facilitate the installation of the gap sealer. Likewise, a rubber mallet or other similar tools may also be used to install the gap sealer by applying impact forces to the clamping head.

When the gap sealer is mounted, the sealing tail 80b is biased against the second member 87 of flange 85 of the lower sidewall panel 50b. This biased pressure is caused by the memory of the sealing tail 80b and/or the covering body 79b which was formed at an angle, at several angles, or curved as described above and as illustrated in FIGS. 7, 8 and 9. The sealing tail 80b, in conjunction with the covering body, applies enough sealing pressure against the second member 87 so that the covering body 79b covers and closes the entire sidewall panel gap 60. With the pressure asserted against the second member 87 of the flange 85, the covering body 79b prevents high-velocity air containing contaminants from entering the auto rack car 40 through the gap. As previously noted, this gap sealer 65B with a bumper 67 is used on the second level 57 on a tri-level auto rack car 40, as seen in FIG. 2.

It should be appreciated that the gap sealer 65, the gap sealer 65A, or the gap sealer 65B with the bumper 67 could be installed upside-down. In other words, the attaching head could be connected to the flange of a lower sidewall panel and the sealing tail could bias against the flange of an adjacent upper sidewall panel.

Another embodiment of the gap sealer of the present invention is shown in FIGS. 10 and 11 and generally indicated as 65C. In this embodiment, the attaching head 75c is modified in that it includes a securing tongue 88 attached to the outside wall 77c. This securing tongue 88, when mounted contacts the upper side of the first member 86 of the flange 91 to assist in securing the attaching head to the upper sidewall panel 50. This embodiment also has a locking arm 89 which extends from the covering body 79c toward the outside of the auto rack car 40 when mounted. At the end of the locking arm 89 is a leg 90 which contacts the lower side of the first member 86. This modification to the attaching head and the addition of the locking arm 89 and leg 90 secures the gap sealer 65C in place. This embodiment of the gap sealer does not have gripping teeth, but could be manufactured with them. Except for these modifications, this embodiment of the present invention is similar to the first embodiment. Illustrated in phantom is the resting position of the covering body 79c and the sealing tail 80c of gap sealer 65C, showing the angle of the sealing tail and gap sealer prior to installation on the sidewall panels. Thus, when installed, the tail will be biased against the lower panel. It should be appreciated that FIG. 11 illustrates this embodiment with the bumper 67c, but it may be provided without the bumper, as seen in the embodiment of FIG. 10.

A further embodiment of the gap sealer with a bumper is shown in FIG. 12 and generally indicated by the numeral 65D, which differs from the embodiment of FIG. 11 only in that the locking arm 89a does not include a leg. The locking arm 89a directly contacts the underside of flange member 86 of the sidewall panel flange 85, thereby locking the attaching head 75d of the gap sealer 65D to the sidewall panel 50. This embodiment may also be constructed with or without a bumper 67d. Again, the position of the covering body 79d and sealing tail 80d, prior to mounting, are shown in phantom.

Another embodiment of the gap sealer is shown in FIG. 13 and generally indicated by the numeral 65E which differs from the embodiments of FIGS. 11 and 12 in that a securing wedge 91 is provided instead of a locking arm. The securing wedge 91 is of triangular shape and is attached to the outside surface of the covering body 79e. The securing wedge 91 assists in locking the attaching head 75e to the flange 85. This embodiment may also be constructed with or without a bumper 67e.

A further embodiment of the gap sealer of the present invention is illustrated in FIGS. 14 and 15 and generally indicated by the numeral 65F, which differs from the embodiment in FIGS. 8 and 9 in the form of the bumper. The gap sealer 65F of FIGS. 14 and 15 includes an attaching head 75f, a covering body 79f, and a sealing tail 80f, all of similar construction to the gap seal 65 of FIGS. 8 and 9. Additionally, the gap sealer 65F is extruded with a hollow bullet-shaped bumper 94. The bullet bumper 94 extends generally horizontally and includes two substantially parallel vertically spaced panels 95a and 95b which extend substantially perpendicular from the covering body 79f to arcuately shaped panels 95c and 95d that converge at 96. The bumper is extruded from a plastic such that the bumper has a seventy-four A (74A) durometer hardness rating which allows the necessary flexibility to absorb the impact of a vehicle door. The attaching head, covering body, and sealing tail of the gap sealer 65F have an eighty D (80D) durometer hardness rating except for the gripping teeth 78f which have a seventy-four A (74A) durometer hardness rating.

The post gap sealer, the roof gap sealer, and the floor gap sealer are all generally constructed in the same form, as illustrated in FIG. 16. All three of these devices have an attaching head AH with the gripping teeth GT and a sealing tail or flap ST and are thus primarily interchangeable depending on the size of the gaps. Thus, the size of each of these sealers may vary.

FIGS. 17 and 18 illustrate the post gap sealer 69. The post gap sealer 69 has an attaching head 75g identical in shape and material to attaching head 75 of the gap sealer 65. The post gap sealer 69 further includes a sealing tail or flap 80g that may be constructed from flexible PVC having approximately a seventy-four A (74A) durometer hardness rating and integrally connected to inside wall 76g of the attaching head 75g. This sealing tail 80g covers the vertically extending gap 61 between a vertical post 49 and a sidewall panel 50 and prevents high-velocity air from entering the auto rack car 40 through that gap. As illustrated in FIGS. 17 and 18, the sealing tail 80g biases against the side wall 98 of the vertical post 49, covering, closing, and sealing the vertically extending gap 61. The sealing tail extends in a common plane with the inside wall 76b, and it can bias against the post pointing toward the outside of the auto rack car, or toward the inside as shown in phantom in FIG. 18. It should be noted that the gripping teeth 78g are made from a flexible PVC having approximately a seventy-four A (74A) durometer rating, the same material as the sealing flap 80g. The length of the flap 80g is such that it will be bent from its rest position when engaging the post to apply a biasing sealing force.

The roof gap sealer 70 is shown in FIGS. 19 and 20 and has an attaching head 75h identical in shape and material to attaching head 75 of the gap sealer 65, and the post gap sealer 69, and a sealing tail or flap 80h like the sealing tail 80g of the post gap sealer. The roof gap sealer is essentially the same as the post gap sealer 69, but is positioned to close the roof gap 62, and it is sized to close the roof gap. The roof gap sealer 70 covers the horizontal gap 62 between the uppermost sidewall panels and the roof 43 and prevents high-velocity air from entering the auto rack car 40 through that gap. Usually, the vertically extending gaps range from approximately one-half inch to one-inch, while the roof gaps usually range from approximately one-half inch to two and one-half inches.

The floor gap sealer 71, as illustrated in a mounted position in FIGS. 2 and 21, functions in a similar manner to the roof gap sealer and the post gap sealer and is similarly constructed. It includes an attaching head 75i which is secured to the lowermost sidewall panel 50 and a sealing tail 80i which biases against the floor 56A in one of two positions as indicated in phantom. Thus, the floor gap sealer acts to cover, close, and seal the floor gap 63, thereby prohibiting air-contained contaminants from entering the auto rack car through the floor gaps.

Figure 37:
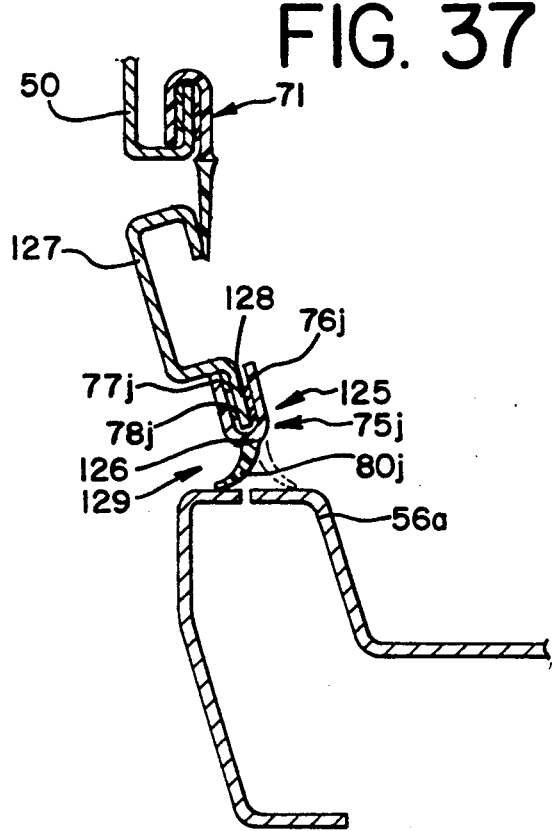
FIG. 37 is a cross-sectional view of the secondary floor gap sealer shown mounted on a differently constructed auto rack car.
Figure 36:
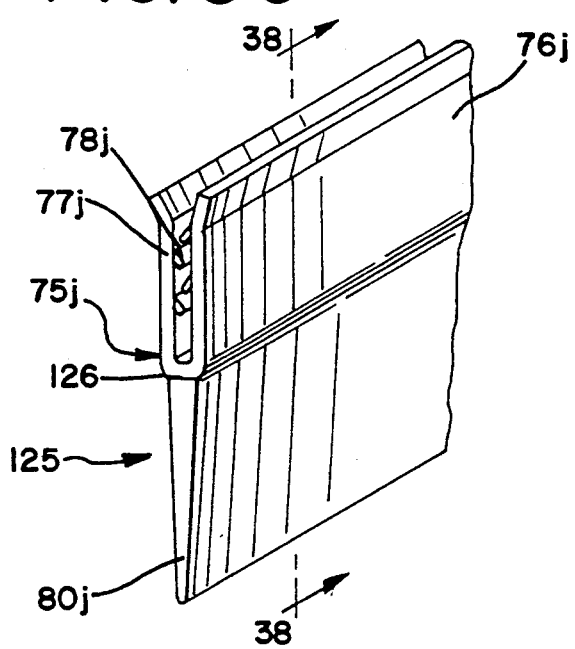
FIG. 36 is a perspective view of a further sealing member of the invention prior to installation which can serve as a secondary floor gap sealer.
Figure 38:
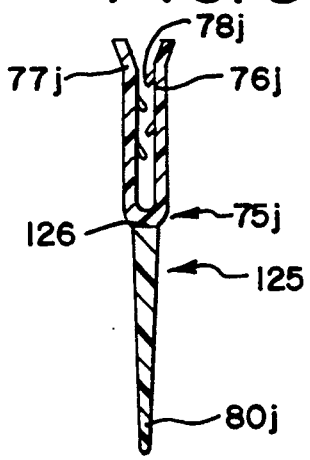
FIG. 38 is a cross-sectional view of the secondary floor gap sealer of FIG. 36 taken substantially along line 38—38 of FIG. 36.

Another floor gap sealer embodiment is illustrated in FIGS. 36, 37 and 38 and generally indicated by the numeral 125 for closing a secondary gap created by a car construction that differs from that in FIG. 21. This secondary floor gap sealer 125 is constructed with an attaching head 75j of similar construction to the attaching head of the sidewall gap sealer and the previously described post, roof and floor gap sealers. However, the sealing tail 80j is integrally connected to the attaching head at the opposite end, specifically at the joint 126 connecting the inside wall 76j to the outside wall 77j. The attaching head is extruded from a rigid PVC having approximately an eighty D (80D) durometer rating, while the sealing tail and the gripping teeth 78j are co-extruded from a flexible PVC having approximately a seventy-four A (74A) durometer rating.

As illustrated in FIG. 21, in many auto rack cars the lowermost sidewall panel lies adjacent to the floor 56A on the first level 56 of the auto rack car 40. The floor gap sealer 125 is used to cover, close, and seal the gaps formed when the construction of the sidewall is such that a very large gap is defined between the sidewall panels and the floor and an additional panel is needed to close the gap. In this construction, an additional panel 127 is connected to the posts and disposed between the lowest sidewall panel 50 and the floor 56A. This panel 127 has a lower lip 128 which extends toward the floor, but does not touch the floor, and thus creates a secondary floor gap 129. Air-containing contaminants flow through this as similar to the previous gaps and thus allow damage to the finishes of the vehicles being transported. The attaching head of the secondary floor gap sealer is constructed to mount on this lip 128. When mounted the sealing tail biases against the floor 56A and prevents the air-containing contaminants from entering the auto rack car 40. The sealing tail 80j biases against the floor 56 toward the outside of the auto rack car, as shown in solid, or toward the inside of the auto rack car, as shown in phantom. The upper end of panel 127 is flanged like the edges of the sidewall panels, and this end defines a gap with the lowermost sidewall panel that can be closed with a floor gap sealer 71, as shown in FIG. 37.

The separate bumper guard 68 of the invention is shown in FIGS. 22, 23 and 24. Bumper guard 68 includes a mounting base or flange 100 which can be connected to a sidewall panel 50. The mounting base 100 has a series of longitudinally spaced slots 101 of about one-and-three-quarters inches long and five-eighths inch high for aligning with and coacting with sidewall panel holes 52 to receive fasteners when the bumper guard 68 is mounted on a sidewall panel 50. Slots 101 allow for expansion and contraction of the bumper guard 68 and facilitate the mounting and aligning with panel holes. The bumper guard 68 has a tapered resilient flap 68a which projects from the mounting base 100 below the mounting slots 101. The tapered flap 68a absorbs the impact energy of a vehicle door and prevents the vehicle door from contacting the sidewall panels. It is extruded from a plastic, as described below, that gives the desired flexibility and resiliency to absorb impact forces from a vehicle door without causing any damage to the door or finish.

The manner of mounting the guard 68 to a panel is shown in FIGS. 22 and 24 where button fasteners 102 engage the slots of the bumper guard 68 and the panel holes to secure the guard to the sidewall panel 50. The bumper guard 68 is attached to the sidewall panel 50 by pushing a fastener such as a button fastener 102 through mounting base slots 101 and through a sidewall panel hole 52.

The button fastener 102 has a round button top or head 103 which has a greater diameter than the height of a mounting base slot 101. Two symmetrically spaced apart button rods 104 extend from the head 103 defining a split shank. Locking tabs 105 are formed on the end of the rods 104 to lock on the backside of the panel when the fastener is pushed through the holes, as seen in FIG. 22. The two button rods are squeezed together during driving the fastener through the holes and snap apart when fully inserted to lock in place and secure the bumper guard to the sidewall panel. The fastener can be inserted by hand or by a tool. Any number of button fasteners 102 may be used to secure the bumper guard 68 to the sidewall panel 50.

The bumper guard 68 and the button fastener 102 may be made from Low Density Polyethylene of approximately a sixty D (60D) durometer hardness rating, and they may include a UV inhibitor as described above. This UV inhibitor is important for the button fastener 102 because the locking tabs 105 protrude from the sidewall panel 50 and are subject to ultraviolet rays during daylight hours.

Another form of fastener for attaching the bumper guard 68 to the sidewall panel is illustrated in FIGS. 25 to 32 and generally indicated by the numeral 110. This fastener 110 consists of two parts, specifically a locking body 111 and a locking stud 112.

The locking body 111 has a head 113, preferably but not necessarily of square configuration, which is larger than the height of the mounting base slot 101 of the bumper guard 68 to coact with the tapered flap 68a and maintain orientation of the entire fastener and to enable the head to maintain maximum purchase on the mounting base 100. The head 113 includes an insertion hole 114, extending through the head 113 and within which the locking stud 112 is inserted when assembling the fastener in locking position. The insertion hole 114 includes opposed round sides and opposed parallel flat sides that define two shoulders 115a and 115b, each shoulder being the top of a locking tab 116, which is integrally connected to the head. Thus, two opposed locking tabs extend from the head of locking body 111. The shoulders 115 coact with stops 117 of the locking stud 112 when the locking stud is inserted into the locking body to prevent the locking stud from being pushed completely through the locking body 111. They also indicate when the locking stud is fully inserted to drive the locking tabs into locking position.

Each locking tab 116 includes a locking shoulder 118 at its end which extends in a direction away from the center of the insertion hole 114 and which abuts the outside wall of the sidewall panel when mounted, thereby locking the bumper guard 68 in place. Each locking tab also includes an inwardly extending triangular stud locking detent 119 which extends toward the center of the insertion hole and coacts with indents or grooves 120 of the locking stud, thereby locking the locking stud in place when fully inserted into the locking body and forcing the tabs apart. As particularly seen in FIG. 28, the detents 119 include inclined camming surfaces coacting with inclined camming surfaces on the nose of the locking stud to facilitate insertion of the stud to its locking position.

Thus, the fasteners 110 function to lock the bumper guard to sidewall panels by aligning slots in the guard with panel holes, inserting the locking body through a slot and hole until the head of the body contacts the guard, and then drawing a locking stud into the locking body to lock the body in place.

In order to facilitate the handling of the fastener 110, the locking stud may be integrally connected to the locking body by a flexible link 121, as seen in FIG. 30. This link enables the fastener to be a unit before it is used and can be molded with the body and stud.

A further form of fastener for attaching the bumper guard 68 to the sidewall panel is illustrated in FIGS. 33, 34 and 35 and generally indicated by the numeral 130. Fastener 130 includes button head 131, preferably but not necessarily of square configuration, which is larger than the height of the mounting base slot 101 of the bumper guard 68 to coact with the tapered flap 68a and maintain orientation of the entire fastener and to enable the head to maintain maximum purchase on the mounting base 100. A cylindrical stem 132 is integrally connected to and extended from the button head 131 and coacts with the mounting base slot and the panel holes 52. A shaft 133 having a smaller diameter than stem 132 extends from the stem. Integrally connected on opposing sides of the shaft 133 are a pair of locking tabs 134 which, when inserted through the mounting base slots 101 and the sidewall panel holes 52, bend toward the shaft 133. After being fully inserted the locking tabs 134 spring back and take their original position as shown in FIG. 33, thereby locking the bumper guard 68 in place by coacting with the sidewall panel.

The present invention further includes a roof bumper guard 135, as illustrated in FIGS. 39 to 43. On the third level 58 of the tri-level auto rack car 40, as illustrated in FIG. 2, the roof 43 has an inwardly slanting portion, and extending downwardly from the slanting portion a roof plate 43a, which terminates just above the sidewall panels. The upper edge of a vehicle door can contact the slanting portion of steel roof 43, thereby damaging the vehicle door. To avoid this problem, a roof bumper guard 135 may be mounted on the roof plate 43a which is connected to the roof 43. Specifically, the roof 43 is corrugated such that it is attached to the plate at regular intervals, as specifically illustrated in FIG. 43. This construction and attachment of the roof prevents the use of the gap sealer with a bumper or the separate bumper guard.

The roof bumper guard 135 includes a mounting plate or flange 137 constructed at an angle corresponding to the angle of the roof plate 43a such as to facilitate surface-to-surface contact. Extending into the auto rack car from the mounting plate 137 is a tapered resilient flap 138 which extends from the roof sufficiently such that a vehicle door will contact it before contacting the roof. Also extending from the mounting plate is a locking bar 139. This bar is constructed to coact with a spring clip or clamp 140 to attach the roof bumper guard to the upper flange of the roof plate 43a. The clip 140 is U-shaped and includes locking teeth 141 on arm 142 and a locking indent 143 on opposed arm 144. The teeth engage the roof plate 43a, while the indent 143 engages the locking bar 139 of the guard to assure secure attachment of the guard to the roof plate. Specifically, the spring clip, preferably made from steel, is snapped into place on the roof bumper guard at the intervals where the corrugated roof does not contact the roof plate, as specifically illustrated in FIG. 43, thereby attaching the roof bumper guard to the roof plate. Alternatively, the clip may be made of a generally rigid but somewhat flexible plastic. When attached, the roof bumper guard prevents a vehicle door from contacting the roof 43 and/or the roof plate 43a.

Figure 44:
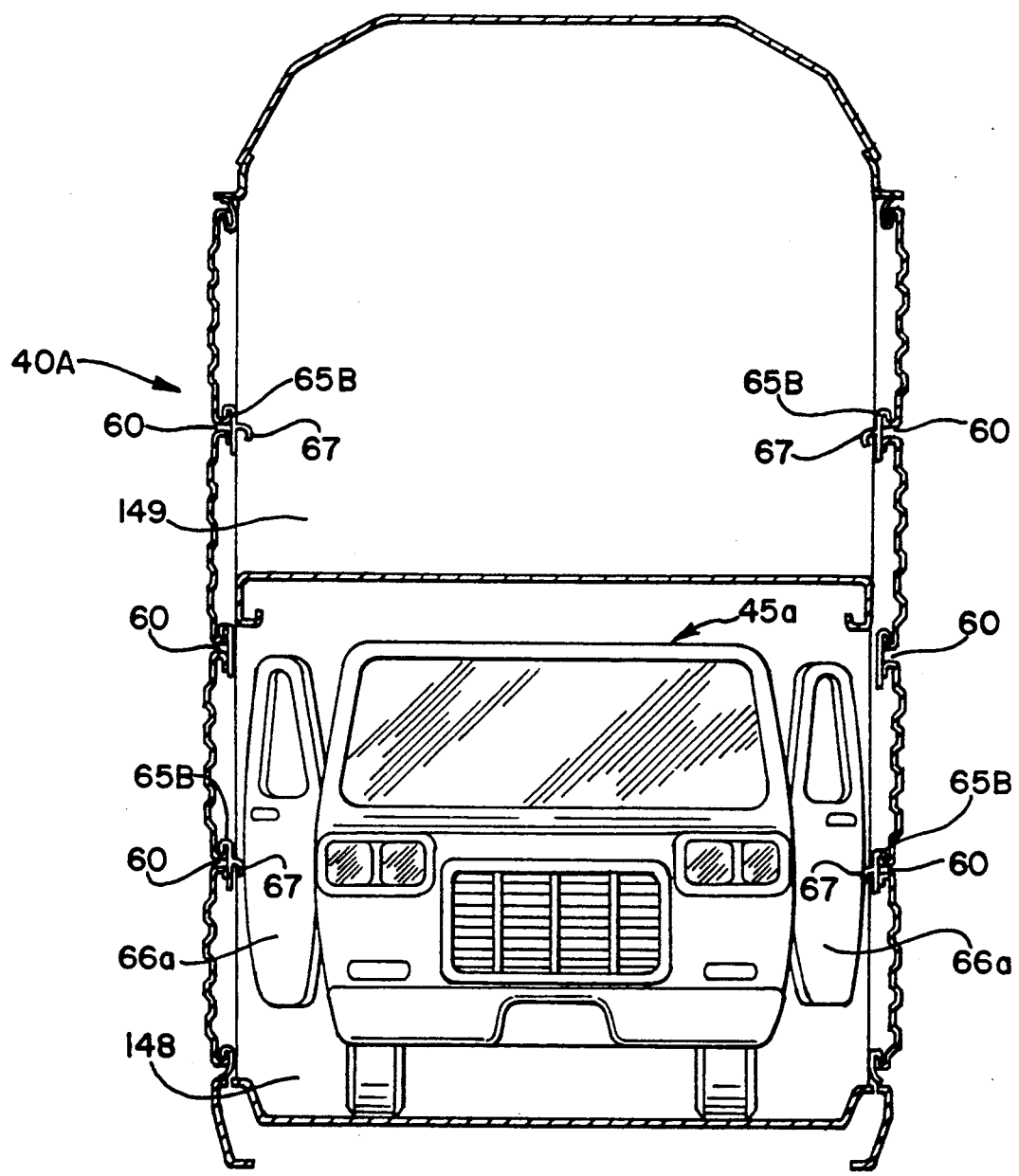
FIG. 44 is a cross-sectional view of a bi-level auto rack car having gap sealers and gap sealers with bumpers mounted on the sidewall panels according to the present invention.

FIG. 44 illustrates a bi-level auto rack car 40A which differs from the tri-level car generally only in that it includes two levels for vehicles instead of three. The bi-level auto rack car 40A has a lower level 148 and an upper level 149. The bi-level auto rack car 40A is generally used to transport larger vehicles, such as vans, mini-vans, pickup trucks, and four-by-four vehicles. The bi-level auto rack car 40A can usually transport twelve of these vehicles 45a, six on each level. On the bi-level auto rack car 40A, the upper and lower sidewall panel gaps 60 are located at the approximate level of the vehicle door 66a on both the lower level 148 and the upper level 149. Accordingly, the gap sealer 65B with a bumper 67 can be used on both levels of the bi-level auto rack car to prevent the flow of high-velocity air into the bi-level auto rack car as well as to prevent a vehicle door from contacting the sidewall panels.

It should also be appreciated that a gap sealer without a bumper, such as gap sealer 65, could be used in conjunction with a bumper guard 68 mounted just above or below the sidewall panel gap 60 thereby solving both problems.

It will be understood that modifications and variations may be effected without departing from the scope of the novel concepts of the present invention, but it is understood that this application is to be limited only by the scope of the appended claims.

The invention is hereby claimed as follows:

1. In an auto rack railroad car having opposed walls each including a plurality of horizontally extending and vertically spaced apart sidewall panels, a one-piece bumper guard horizontally mounted on a sidewall panel for preventing a vehicle door from contacting the sidewall panel and to absorb door impact forces and yield to body contact, said bumper guard comprising a mounting base and a bumper extending therefrom, wherein said bumper extends cantileverly from the mounting base and said mounting base contacts and is directly connected to the sidewall panel, and said bumper including a straight section having an inner end connected to the mounting base and an outer end and a contact section having one end connected to the outer end of said straight section and one end extending free and in spaced relation to the sidewall panel, whereby any initial bumper contact is made by the contact section.

2. The bumper guard as defined in claim 1, wherein said mounting base includes a plurality of slots, and a plurality of button fasteners coacting with said slots and a plurality of holes on the sidewall panel for attaching the bumper guard to the sidewall panel and compensating for expansion and contraction of the bumper guard.

3. The bumper guard of claim 2, wherein the fastener includes a locking body and a locking stud coacting with the locking body to secure the bumper guard to the sidewall panel, wherein after aligning one of said slots in the bumper guard mounting base with one of said holes in the panel, the locking body of the fastener is inserted into the aligned slot and hole and the locking stud is applied to the locking body to lock the fastener in place.

4. The bumper guard of claim 3, wherein the locking body includes a head and a pair of tabs extending therefrom and receivable in the aligned slot and hole, said tabs including locking detents movable toward each other upon insertion of the locking body into the slot and hole and movable away from each other into detenting position upon seating the locking stud in the locking body.

5. In an auto rack railroad car having opposed walls supporting a roof, a one-piece roof bumper guard mounted on the roof for preventing a vehicle door from contacting said roof and to absorb door impact forces and yield to body contact, said roof bumper guard comprising a mounting plate and a bumper extending therefrom, wherein said bumper extends cantileverly from the mounting base and said mounting base contacts and is directly connected to the roof, and said bumper including a straight section having an inner end connected to the mounting base and an outer end and a contact section having one end connected to the outer end of said straight section and one end extending free and in spaced relation to the roof, whereby any initial bumper contact is made by the contact section.

6. The roof bumper guard as defined in claim 5, wherein said mounting plate is attached to said roof by a spring clamp.

7. An extruded plastic bumper for an auto rack car for absorbing impact forces from a vehicle door, said bumper comprising a mounting plate adapted to be attached to one of the sidewall panels or the roof of the car, and a resilient, impact-absorbing flap extending from said mounting plate, said flap and mounting plate being one-piece, said flap having a cantileverly extending straight section connected to the mounting plate and a generally semicircular curvate section connected to the straight section, said straight section having an inner end connected to the mounting plate and an outer end connected to the curvate section, said curvate section having an inner end connected to the straight section and an outer terminal end in spaced relation to the mounting plate for yieldably receiving impact forces from the vehicle door and to yield to body contact.

8. The bumper of claim 7, whereby the bumper is made of a low-density polyethylene of about 60D durometer hardness.

9. The bumper of claim 8, wherein the mounting plate includes spaced slotted openings therealong for receiving fasteners to secure the bumper to a sidewall panel and to compensate for expansion and contraction due to temperature changes.

10. The bumper of claim 7, wherein the straight section extends perpendicular to the mounting plate.

11. The bumper of claim 7, wherein the straight section extends non-perpendicular to the mounting plate.

12. The bumper of claim 7, wherein the curvate section extends downwardly.

13. The bumper of claim 7, wherein the curvate section is tapered.

14. The bumper of claim 7, which further includes means for fastening the bumper to one of the sidewall panels or the roof.

15. The bumper of claim 7, which further includes spring clips for fastening the mounting flange to a flange on the roof.

16. The bumper of claim 7, which further includes metal spring clips for fastening the mounting flange to a flange on the roof.

17. The bumper of claim 7, which further includes plastic spring clips for fastening the mounting flange to a flange on the roof.

* * * * *